(12) United States Patent
Matsumoto

(10) Patent No.: US 7,827,412 B2  
(45) Date of Patent: Nov. 2, 2010

(54) CONTENT PRESENTING METHOD

(75) Inventor: Tetsuya Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1036 days.

(21) Appl. No.: 11/515,819

(22) Filed: Sep. 6, 2006

(65) Prior Publication Data

US 2007/0055648 A1 Mar. 8, 2007

(30) Foreign Application Priority Data

Sep. 6, 2005 (JP) .............................. 2005-258154

(51) Int. Cl.  
*G06F 21/00* (2006.01)

(52) U.S. Cl. ..................... 713/186; 713/185; 713/182; 382/115; 382/118

(58) Field of Classification Search .................. None  
See application file for complete search history.

(56) References Cited

U.S. PATENT DOCUMENTS 7,120,278 B2 * 10/2006 Sukegawa et al. ........... 382/118  
7,454,041 B2 * 11/2008 Sukegawa et al. ........... 382/118  
7,571,442 B2 * 8/2009 Van Der Spuy ............. 719/315

FOREIGN PATENT DOCUMENTS

JP 2003-32356 A 1/2003

* cited by examiner

*Primary Examiner*—Pramila Parthasarathy  
(74) *Attorney, Agent, or Firm*—Sughrue Mion, PLLC

(57) ABSTRACT

The contents presenting apparatus comprises: a registering device which registers user information that is specific to a user; a judging device which judges user interface attributes which are suited to the user, according to the user information registered in the registering device; a producing device which produces contents having the user interface attributes judged by the judging device; and a presenting device which presents the contents produced by the producing device.

2 Claims, 6 Drawing Sheets

FIG.3

"IMAGE UPLOAD"

SELECT LOCAL FILE WITH MOUSE, AND CLICK BUTTON

FIG.4

"LET'S TRANSFER PHOTO"

PRESS THIS BUTTON TO SHOW LIST OF PHOTOS.
SELECT PHOTO, AND THEN PRESS OK BUTTON

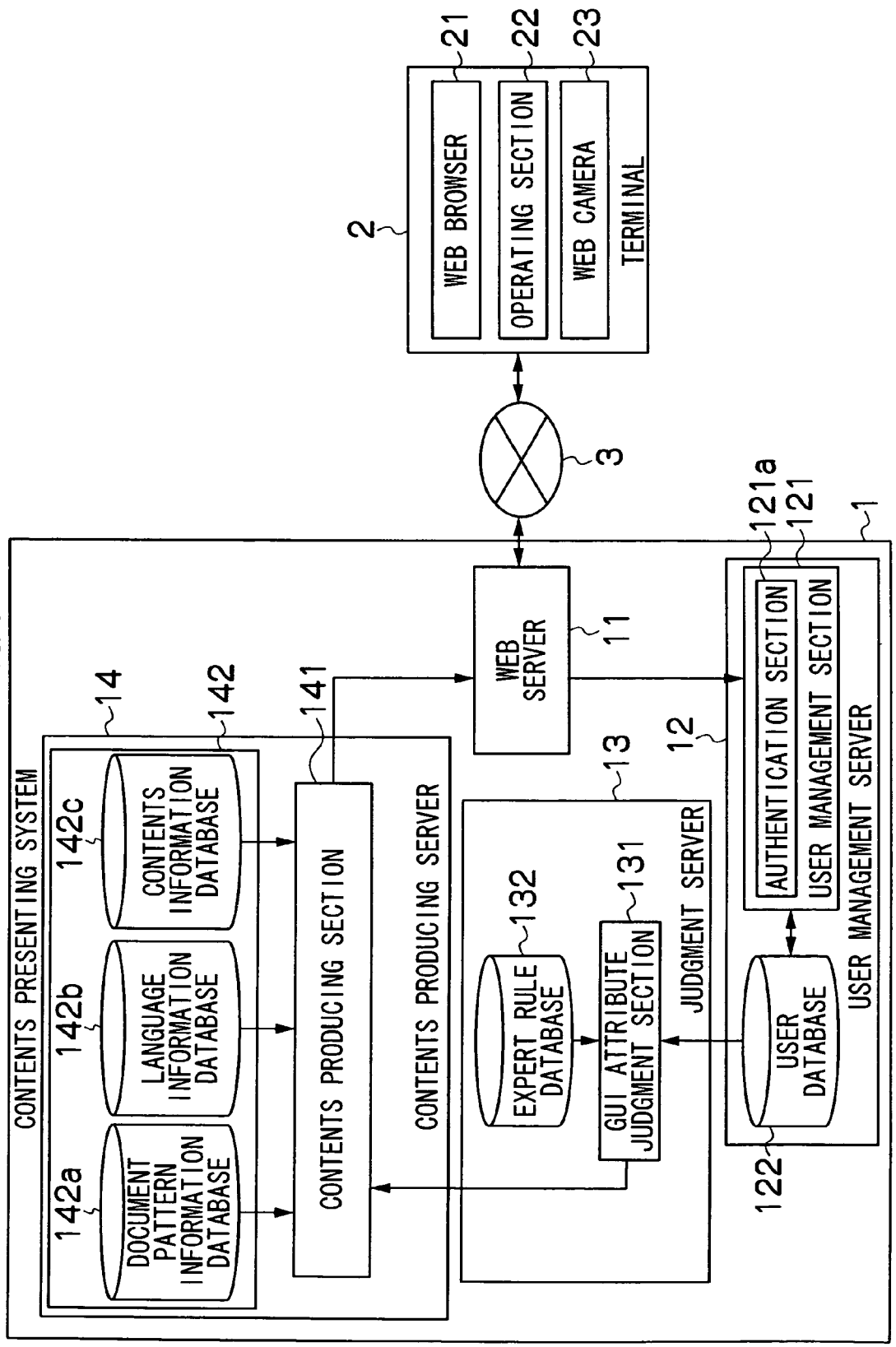

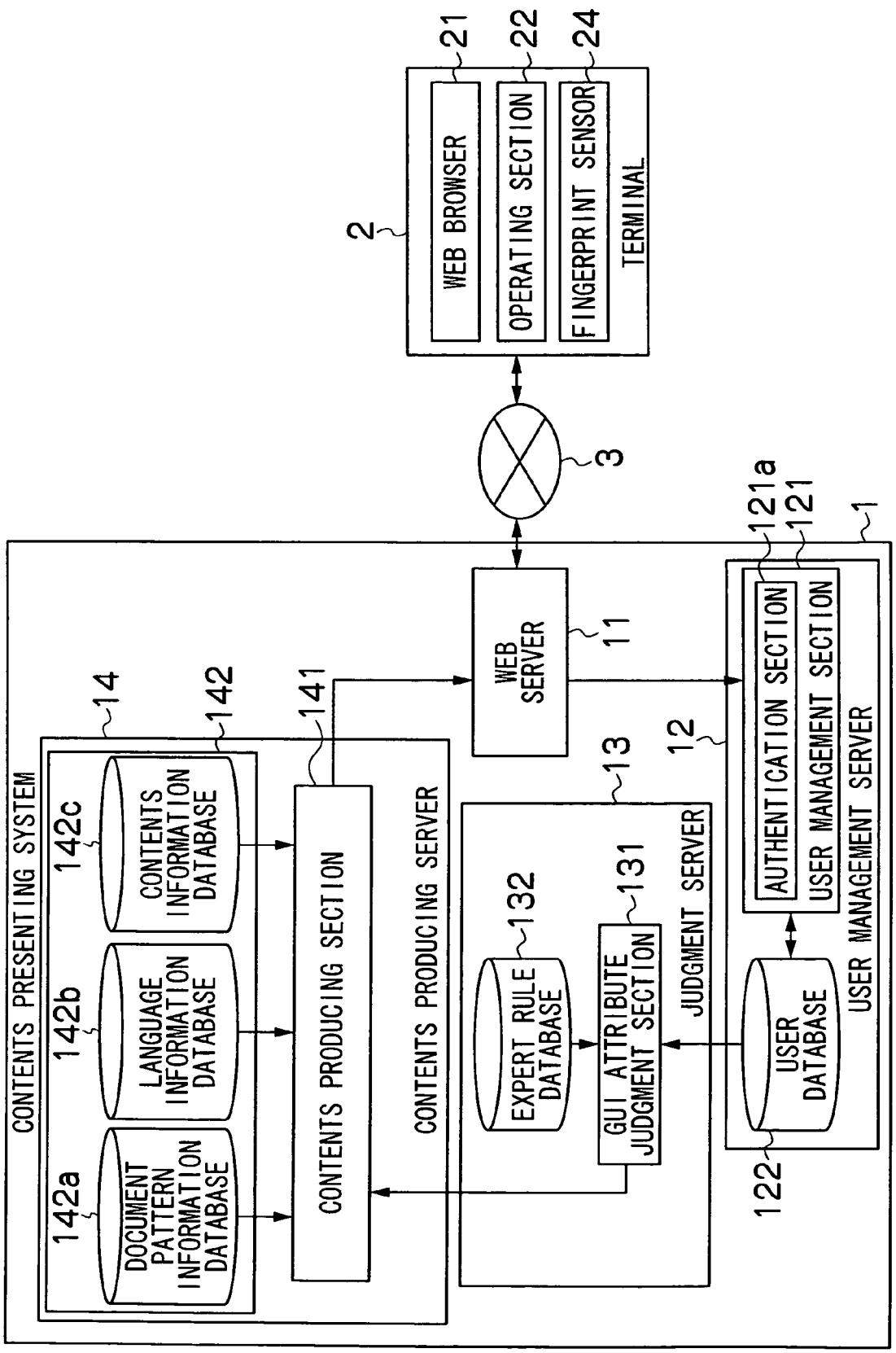

CONTENT PRESENTING METHOD

BACKGROUND OF THE INVENTION

1. Field of the Invention

The present invention relates to technology for automatically presenting contents that are suited to a user.

2. Description of the Related Art

There are various technologies for presenting contents that are suited to a user. For example, Japanese Patent Application Publication No. 2003-32356 discloses a portable terminal including: a user interface cross-reference table, in which user interface specifications for a user interface used to exchange information with the user is recorded, in cross-reference with user attribute information; and a processing device which selects and employs user interface specifications of the user interface corresponding to subscriber information from the user interface cross-reference table on the basis of the subscriber information recorded in a nonvolatile memory.

Currently, many websites in the world have contents prepared in a plurality of languages, such as Japanese, English, and the like, so that they are suitable for users of various different countries. Moreover, some websites have ability to switch their functions that can be used by switching the modes, for instance, between a simple mode and a standard mode. However, in many cases, the user him or herself needs to select and set the mode, and this is bothersome.

Moreover, the user interface settings are settled in advance by the contents creator, and even a skilled computer user will have difficulty in accurately ascertaining his or her own skill level, and appropriately selecting one of the user interfaces.

Further, the digital divide users such as elderly people may have difficulty actually performing the operations of selecting and setting the user interface.

Furthermore, even if a suitable user interface is selected, many of the user interfaces are displayed in the national standard language, and depending on the user, it may be that the interface would be easier to understand if it is based on dialectal words that are more familiar to the user.

SUMMARY OF THE INVENTION

The present invention has been contrived in view of such circumstances, an object thereof being to provide technology for automatically creating a user interface that is suited to each respective user.

In order to attain the aforementioned object, the present invention is directed to a contents presenting apparatus, comprising: a registering device which registers user information that is specific to a user; a judging device which judges user interface attributes which are suited to the user, according to the user information registered in the registering device; a producing device which produces contents having the user interface attributes judged by the judging device; and a presenting device which presents the contents produced by the producing device.

According to the present invention, user interface attributes that are suited to the user are judged in accordance with user information, and contents having the user interface attributes suited to the user are produced accordingly. Therefore, it is possible to present contents that are suited to each user, and hence it is possible to present contents that are easy to use by users having various different characteristics. Furthermore, if the judging device which judges the user interface attributes that are suited to the user, and the producing device which produces the contents are separated, then maintenance is facilitated, and the system can be managed and serviced easily.

Preferably, the contents presenting apparatus further comprises a changing device which changes the user interface attributes of the contents produced by the producing device, to desired attributes.

According to this aspect of the present invention, since the judging device may also make an inappropriate judgment, it is desirable for the user to be able to change by him or herself, the user interface attributes of the contents.

Preferably, the contents presenting apparatus further comprises: an authenticating device which authenticates whether or not the user is a legitimate user, according to physical characteristics information of the user, wherein the judging device judges the user interface attributes which are suited to the user authenticated to be the legitimate user by the authenticating device.

According to this aspect of the present invention, it is possible to receive the presentation of contents which are suited to the legitimate user only.

Here, the user's physical characteristics information includes characteristic quantities of unique specific points in a side view of the user's face (for example, the lateral profile, either the left or right pupil, the tip of the chin, the tip of the nose, and the like). It may also include characteristic quantities for unique specific points of a front view of the user's face.

In order to attain the aforementioned object, the present invention is also directed to a contents presenting method, comprising the steps of: registering user information that is specific to a user; judging user interface attributes which are suited to the user, according to the user information registered in the registering step; producing contents having the user interface attributes judged in the judging step; and presenting the contents produced in the producing step.

In order to attain the aforementioned object, the present invention is also directed to a computer readable medium having embodied thereon a contents presenting program, the program comprising: a first code segment for a step of registering user information that is specific to a user; a second code segment for a step of judging user interface attributes which are suited to the user, according to the user information registered in the registering step; a third code segment for a step of producing contents having the user interface attributes judged in the judging step; and a fourth code segment for a step of presenting the contents produced in the producing step.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a diagram showing an embodiment of Web contents produced for a document pattern ID=P1 and a language ID=L1;

FIG. 4 is a diagram showing an embodiment of Web contents produced for a document pattern ID=P3 and a language ID=L1;

FIG. 6 is a block diagram of a contents presenting system which performs user authentication by means of facial authentication; and FIG. 7 is a block diagram of a contents presenting system which performs user authentication by means of fingerprint authentication.

DETAILED DESCRIPTION OF THE PREFERRED EMBODIMENTS

Figure 1:
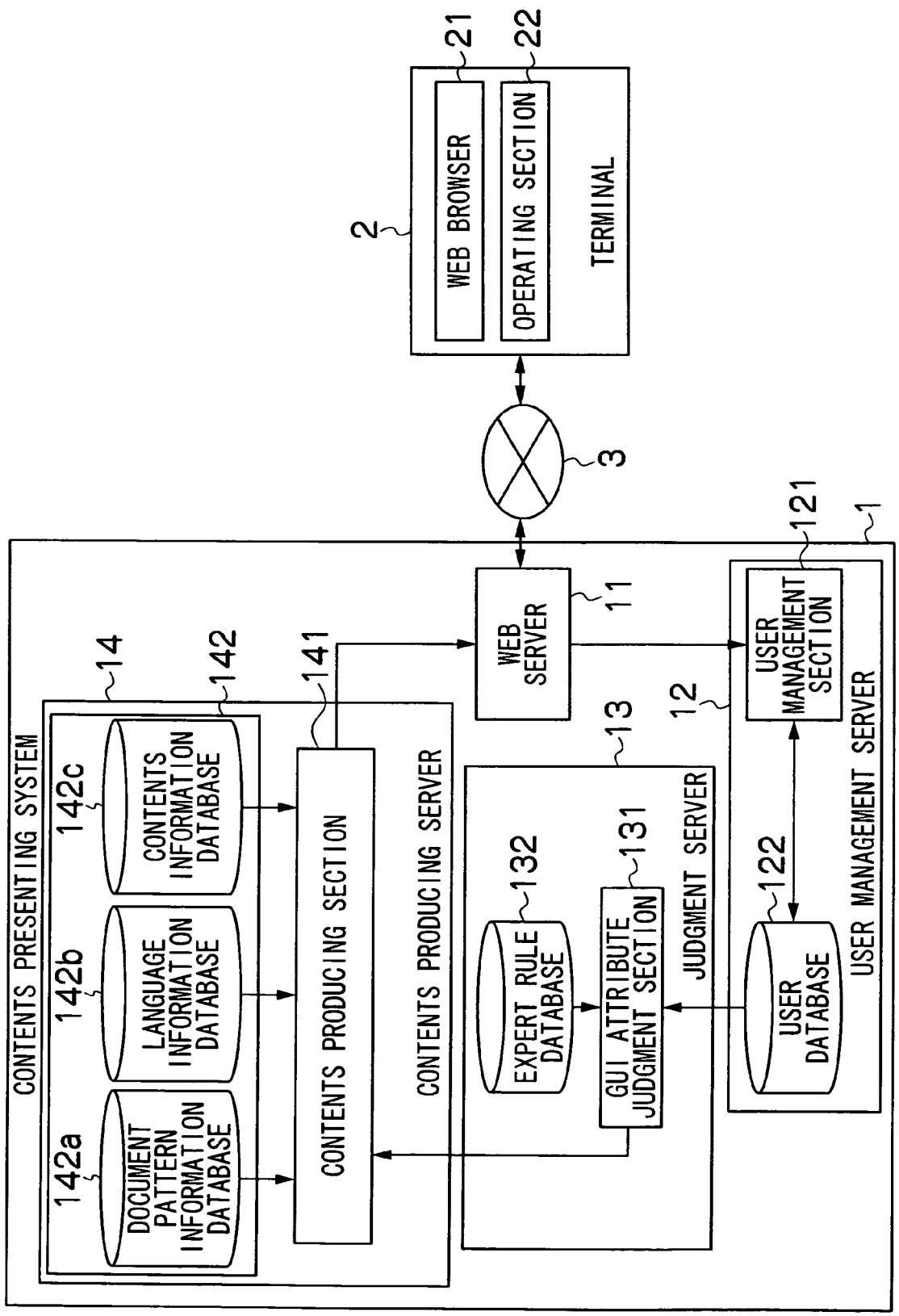
FIG. 1 is a block diagram of a contents presenting system.

FIG. 1 is a block diagram of a contents presenting system according to a preferred embodiment of the present invention. The contents presenting system 1 is connected to one or more of terminals 2 through a network 3, such as the Internet.

The contents presenting system 1 comprises a Web server 11, a user management server 12, a judgment server 13, and a contents producing server 14. It is also possible that the contents presenting system 1 is composed of a single hardware item; however, from a maintenance viewpoint, it is preferable that the contents presenting system 1 is constituted by connecting together the servers 11 to 14 through a LAN, or the like. If the judgment server 13 and the contents producing server 14 are separated, then it is possible to maintain these servers independently, and hence maintenance and management is simplified.

The terminal 2 has a Web browser 21 to receive and display a Web page sent from the Web server 11. The terminal 2 is constituted by a personal computer, a mobile telephone, a personal digital assistant (PDA), a digital camera, or the like. The Web browser 21 in the present embodiment is merely an example of an application which displays a graphical user interface (GUI), and it may also be substituted for another GUI display application which can be employed in various electronic apparatuses, such as a personal computer, a mobile telephone, a PDA, a digital camera, or the like.

The Web server 11 is run by one of a variety of services, such as a community website, a commercial website, or the like. The Web server 11 sends a registration form, which is a web page for registering user information, to the terminal 2, and at the terminal 2, the user inputs user information to the registration form, by operating an operating section 22 constituted by buttons, a keyboard, a mouse, and the like. The inputted user information is sent to the Web server 11.

There are no particular restrictions on the user information, provided that it is information that relates to each user, but to give one embodiment, it includes the user's name, address, contact details, profession, age, level of computer skills, user ID, password, usage of the Web server 11 (number of access operations, etc.), user characteristics (visual acuity, etc.), and the like.

The Web server 11 transfers the user information inputted in the registration form to the user management server 12, by means of a common gateway interface (CGI) program.

The user management server 12 includes a user management section 121, which stores user information in a user database 122, when the user information is received from the Web server 11.

The user management server 12 has a function for individually authenticating the users. The Web server 11 sends an authentication form, which is a web page for authenticating user information, to the terminal 2, and at the terminal 2, the user inputs the user ID and password to the authentication form, by operating the operating section 22. The inputted user ID and password are sent to the Web server 11. The Web server 11 transfers the user ID and password to the user management server 12 through the CGI program.

The user management server 12 authenticates the user by matching the user ID and password contained in the user information in the user database 122 with the user ID and password received from the Web server 11. The user authentication operation is not limited to this format, and it may also use fingerprint-based authentication, facial detection, or other methods. The concrete mode of user authentication is described below.

The judgment server 13 judges the attributes of the Web contents that match the user authenticated by the user management server 12 (hereinafter, this user is called the "authenticated user"). The judgment server 13 has a GUI attribute judgment section 131, and an expert rule database 132. The GUI attribute judgment section 131 is an inference engine which judges attributes for the graphical user interface of the Web page which match the authenticated user, on the basis of the user information stored in the user database 122 and expert rules stored in the expert rule database 132.

The expert rule database 132 stores the expert rules created and accumulated on the basis of experience gained by computers and/or human specialists through learning about the aptitude for Web contents of the users who view Web contents, and who input, output and store data of various kinds, through the Web browser 21 (in the present embodiment, the concept of "user's aptitude" covers the adjustment, level of operating skill, level of understanding, affinity for Web contents, and the like). It is also preferable that the GUI attribute judgment section 131 itself has artificial intelligence capabilities for learning these types of information.

The expert rules stored in the expert rule database 132 are conditional statements covering all of the possible relationships between the types of individual GUI components used and their attributes, and the values and ranges that the items of user information may take. More specifically, a condition is stated in the expert rules stored in the expert rule database 132 which judges that if the user's age is "younger than 35", then the text is to be set to "medium size", and if the age is "35 or older", then the text is to be set to "large size" and "boldface". Another condition is stated which judges that if the number of access operations to the same Web.page is "less than 20 times", then the user is regarded as a "novice", if it is "20 to 50 times", then the user is regarded as an "intermediate", and if it is "more than 50 times", then the user is regarded as an "expert".

The GUI attribute judgment section 131 sends the attributes of the GUI judged to be suited to the authenticated user, to the contents producing server 14, as attribute information. The GUI attributes are elements which determine the attributes of the Web contents, and to give one embodiment, these attributes include the ID of the HTML file, the text size, text color, language (including regional variations within the same language, such as dialects), and the like. Here, as one embodiment of attribute information, a document pattern ID, a language ID and a contents ID are sent.

Figure 2:
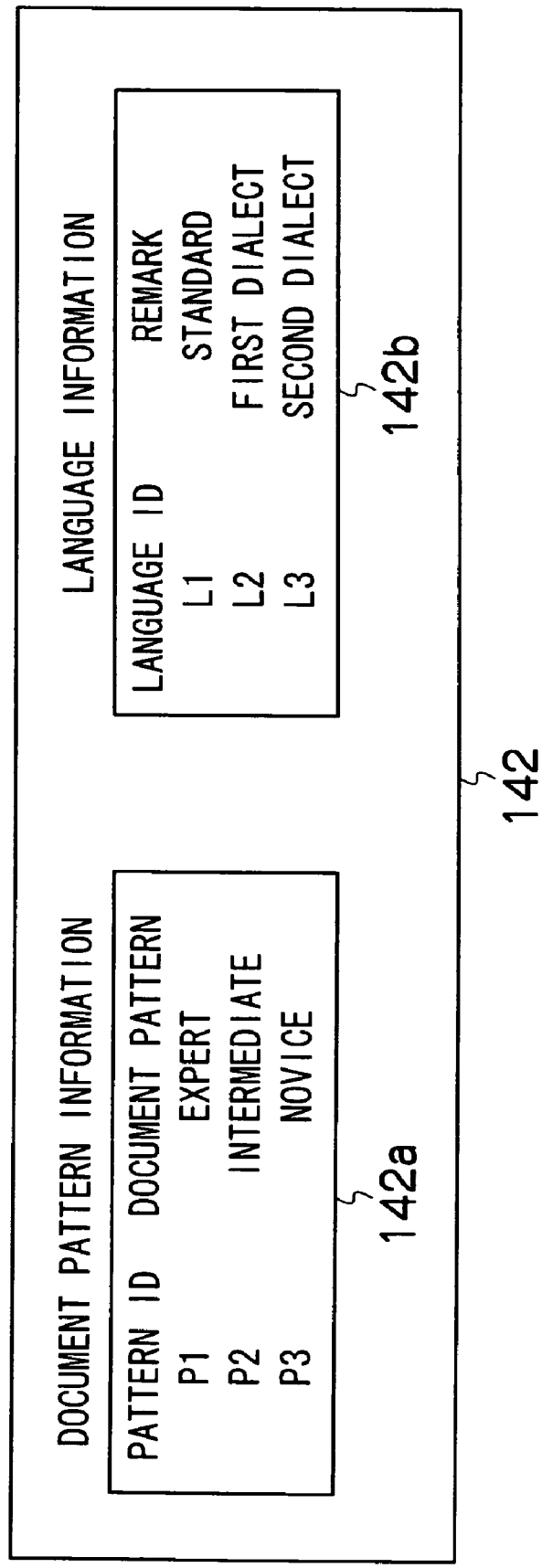
FIG. 2 is an illustrative schematic drawing of information stored in a contents database.

The contents producing server 14 has a contents database 142 including a document pattern information database 142a, a language information database 142b and a contents information database 142c, which store information of the Web contents corresponding to the attribute information. For example, the document pattern information database 142a and the language information database 142b in the contents database 142 respectively store the document pattern information and the language information shown in FIG. 2.

The contents producing server 14 has a contents producing section 141 which dynamically produces Web contents by setting the attributes of the constituent elements of the GUI (including text and images) of the Web contents stored beforehand in the contents database 142, in accordance with the attribute information sent by the GUI attribute judgment section 131. The Web contents produced by the contents producing section 141 are stored in the Web server 11, and are sent in response to a request from the terminal 2.

For example, if the document pattern ID and the language ID are included in the attribute information sent by the GUI attribute judgment section 131, then the contents producing section 141 sets the document pattern corresponding to the document pattern ID, and the language corresponding to the language ID, in the Web contents document.

If the document pattern ID=P1 and the language ID=L1 are sent, then the document pattern for "expert", and the language of "standard" are set. Alternatively, if the document pattern ID=P3 and the language ID=L1 are sent, then the document pattern for "novice", and the language of "standard" are set.

FIG. 3 shows an example of the Web contents for "expert" produced with respect to the document pattern ID=P1 and the language ID=L1, and FIG. 4 shows an example of the Web contents for "novice" produced with respect to the document pattern ID=P3 and the language ID=L1.

There may be cases where the produced Web contents are not suitable for the user, due to an incorrect judgment by the GUI attribute judgment section 131. In order to deal with these situations, it is also preferable that the user is made possible to specify desired attribute information to send to the contents producing server 14, through the Web server 11, by means of the operating section 22 of the terminal 2. In this case, the contents producing server 14 produces the Web contents anew in accordance with the attribute information specified at the operating section 22.

Alternatively, since the tasks of registering user information and specifying attribute information are burdensome for some users, it is also possible to prepare in advance Web contents designed for average users, in the Web server 11, in such a manner that the user is able to select the Web contents designed for average users, or the Web contents produced by specifying attribute information, as he or she desires.

In any case, the judgment made by the GUI attribute judgment section 131 does not absolutely restrict the design of the Web contents.

Figure 5:
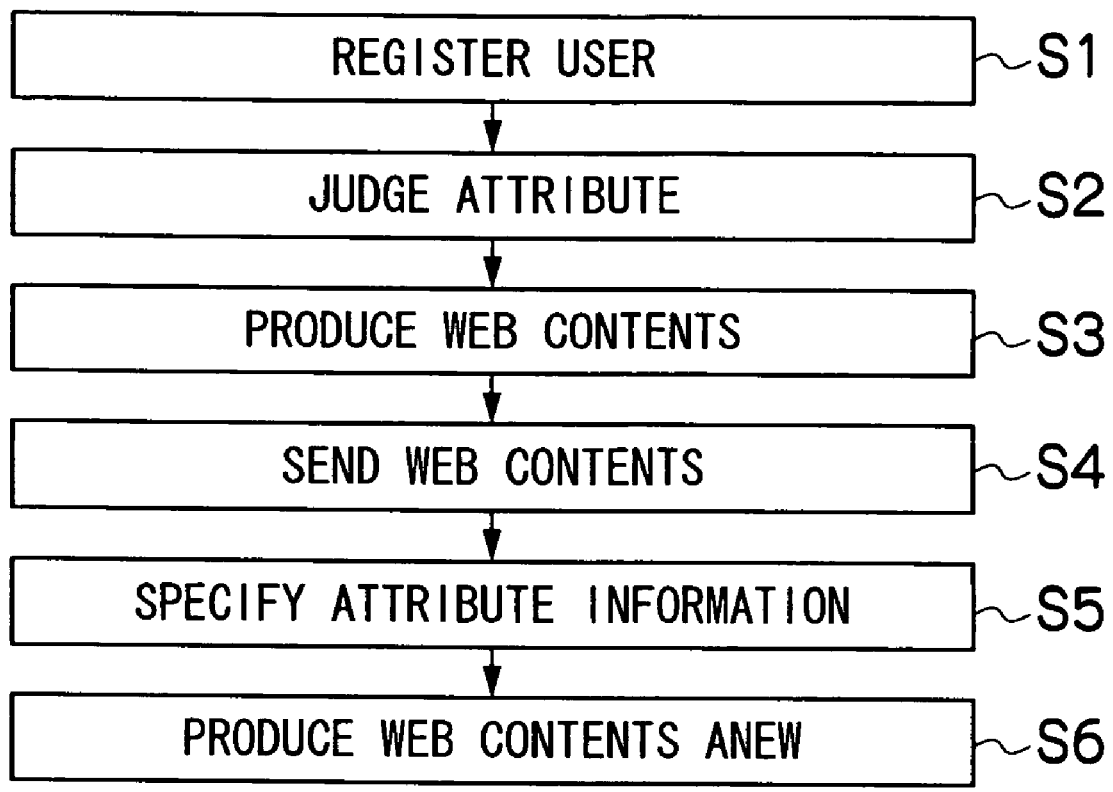
FIG. 5 is a flowchart showing a sequence of the operation of the present system.

FIG. 5 is a flowchart showing a sequence of the operation of the system according to the present embodiment.

Firstly, in the terminal 2, user information is inputted to the registration form in accordance with the operations made at the operating section 22, and this user information is sent to the Web server 11. The user management server 12 stores the user information received from the terminal 2, in the user database 122 (S1).

The judgment server 13 judges attributes of the GUI of the Web contents that are suited to the user, on the basis of the user information and the expert rules stored in the expert rule database 132, and the judgment server 13 sends the result of this judgment to the contents producing server 14, as attribute information (S2).

The contents producing server 14 dynamically produces Web contents in accordance with the attribute information (S3). The Web contents produced by the contents producing server 14 are stored in the Web server 11, and are sent in response to a request from the terminal 2 (S4).

If desired attribute information is specified through the operating section 22 of the terminal 2 (S5), then the contents producing server 14 produces the Web contents anew in accordance with the attribute information specified through the operating section 22 (S6). The Web contents produced anew by the contents producing server 14 are stored in the Web server 11, and are sent in response to a request from the terminal 2. It is preferable that the Web contents are produced anew, each time the user information is updated. In this way, it is possible to adapt the Web contents to the changing skill level of the user.

The present invention also encompasses a program which causes a computer, such as a personal computer or server, provided with a calculating apparatus and a storage apparatus, to execute the steps in S1 to S6 above.

As described above, since the items of the Web contents are dynamically adapted to the user information registered as desired by the user, then it is possible to present Web contents in a form that is easiest for the user to understand and use, in accordance with the characteristics of the user, such as the user's skill in using the terminal 2, the user's age, language, and the like.

Second Embodiment

The user authentication performed by the user management server 12 is not limited to a login system using a user ID and a password, and it is also possible to use biological information or physical characteristics information, such as the shape of the user's face, fingerprint, or the like.

FIG. 6 is a block diagram of a contents presenting system which performs user authentication by means of facial authentication, according to a second embodiment of the present invention. The composition of the servers apart from the user management server 12 of the contents presenting system 1 are the same as the first embodiment, and hence further description thereof is omitted here.

The terminal 2 has a Web camera 23, which captures image data of the user's face (facial image data) and sends the captured facial image data to the user management server 12 through the network 3.

On the other hand, the user management server 12 has the user database 122 in which facial image data of a legitimate user (authenticated facial image) has been stored beforehand, and an authentication section 121*a* which compares the facial image represented by the facial image data sent from the Web camera 23 of the terminal 2 through the network 3, with the authenticated facial image stored in the user database 122, judges whether or not the person whose image has been captured by the Web camera 23 is really the legitimate user, and outputs the judgment result to the judgment server 13.

More specifically, the authentication section 121*a* sets face-specific points such as the pupils, nose and mouth, for the facial image, implements convolution with Gabor filters of different resolutions and orientations at the fiducial points to extract characteristic quantities that indicate the frequency and directionality of the density characteristics around the fiducial points, generates a face graph having elastic positional relationships, by combining the characteristic quantities and the spatial location information between the characteristic points, determines the position of the face using the face graph, detects the fiducial points of the facial image, and compares the similarity of the characteristic quantities around the fiducial points, with the characteristic quantities in the stored authenticated facial image, so as to perform authentication to verify whether the subject of the Web camera 23 is really the legitimate user.

The facial image from which the authentication section 121*a* extracts the fiducial points may be a front view or a side view. For example, the authentication section 121*a* determines the characteristic quantities of the fiducial points of a side view facial image, such as the lateral profile, either the left or right pupil, the tip of the chin, the tip of the nose, and the like, and the authentication section 121*a* performs authentication by comparing these with the characteristic quantities of the authenticated facial image.

FIG. 7 is a block diagram of a contents presenting system which performs user authentication by means of fingerprint authentication, according to a further embodiment of the present invention. The composition of the servers apart from the user management server 12 of the contents presenting system 1 are the same as the first embodiment, and hence further description thereof is omitted here.

The terminal 2 has a fingerprint sensor 24, which obtains the characteristic quantities of the user's fingerprint and sends the obtained characteristic quantities of the fingerprint to the user management server 12 through the network 3.

On the other hand, the user management server 12 has the user database 122 in which identification information including characteristic quantities of the fingerprint of a legitimate user has been stored beforehand, and an authentication section 121a which compares the characteristic quantities of the fingerprint sent from the fingerprint sensor 24 of the terminal 2 through the network 3, with the characteristic quantities of the fingerprint stored in the user database 122, judges whether or not the person having the characteristic quantities of the fingerprint obtained by the fingerprint sensor 24 is really the legitimate user, and outputs the judgment result to the judgment server 13.

As described above, user authentication can be based on facial authentication or fingerprint authentication. However, these are simply examples of authentication technology using biological information or physical characteristics information, and it is also possible to use other user authentication methods (for example, authentication methods based on characteristic quantities relating to the user's iris, voice print, palm, or the like.)

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A Web contents presenting apparatus, comprising: a registering device which registers user information that is specific to a user;
   - a judging device which judges user interface attributes for Web contents which are suited to the user, according to the user information registered in the registering device;
   - a producing device which produces Web contents having the user interface attributes for Web contents judged by the judging device; and
   - a presenting device which presents the Web contents produced by the producing device, wherein the user interface attributes for Web contents are common to plural users sharing skill level relating to at least one of language skill and technical skill, said skill level being included as part of the user information.

2. The apparatus of claim 1, wherein the user interface attributes vary according to at least one of age and skill level, said age and skill level are included as part of the user information.

* * * * *